United States Patent Office.

JONATHAN HEISLER, OF SCHUYLKILL HAVEN, PENNSYLVANIA.

Letters Patent No. 75,161, dated March 3, 1868.

IMPROVED TONIC OR BITTERS.

*The Schedule referred to in these Letters Patent and making part of the same.*

TO ALL WHOM IT MAY CONCERN:

Be it known that I, JONATHAN HEISLER, of the borough of Schuylkill Haven, in the county of Schuylkill, and State of Pennsylvania, have invented a new and improved Tonic or Bitters; and I do hereby declare that the following is a full, clear, and exact description of the manner of compounding and using the same.

My invention is composed of the following ingredients, viz: Black snake-root, one ounce; wild-cherry bark, one ounce; elecampane-root, one-half ounce; sarsaparilla-root, one-half pound; pine-tree gum or pitch, one-fourth pound; buds of balsam-tree, one-fourth pound; alcohol, one-half pint; water, eight quarts.

Process of preparation: The whole is put into a vessel and boiled down to four quarts. It is then allowed to stand until it clarifies, the sediment sinking to the bottom, after which the liquid is dipped out and bottled.

I use it as a remedy for consumption, bronchitis, and all affections of the bronchial tubes and lungs, liver complaint, and dyspepsia.

The dose is, a wineglassful three times a day, before meals.

Having thus fully described my invention, what I claim therein as new, and desire to secure by Letters Patent, is—

The bitters or tonic, compounded and used substantially in the manner and for the purpose as herein described.

JONATHAN HEISLER.

Witnesses:
J. W. ROSEBERRY.
JOHN A. NASH.